United States Patent
Kuo et al.

(10) Patent No.: US 10,726,022 B2
(45) Date of Patent: Jul. 28, 2020

(54) CLASSIFYING SEARCH QUERIES ON ONLINE SOCIAL NETWORKS

(71) Applicant: Facebook, Inc., Menlo Park, CA (US)

(72) Inventors: Shiun-Zu Kuo, Dublin, CA (US); Veselin S. Stoyanov, Palo Alto, CA (US); Rose Marie Philip, Sunnyvale, CA (US); Melissa Rose Winstanley, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 701 days.

(21) Appl. No.: 15/248,993

(22) Filed: Aug. 26, 2016

(65) Prior Publication Data

US 2018/0060326 A1    Mar. 1, 2018

(51) Int. Cl.
*G06F 16/2457* (2019.01)
*G06Q 50/00* (2012.01)
*G06F 16/9535* (2019.01)
*G06F 16/35* (2019.01)

(52) U.S. Cl.
CPC ...... *G06F 16/24578* (2019.01); *G06F 16/353* (2019.01); *G06F 16/9535* (2019.01); *G06Q 50/01* (2013.01)

(58) Field of Classification Search
CPC ................ G06Q 50/01; G06F 16/9535; G06F 16/24578; G06F 16/353
USPC .......................... 707/748, E17.014, 722, 706
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |

(Continued)

*Primary Examiner* — Shiow-Jy Fan
(74) *Attorney, Agent, or Firm* — Jordan IP Law, LLC

(57) ABSTRACT

In one embodiment, a method includes receiving a search query inputted by a first user, wherein the search query comprises one or more n-grams; calculating a needle-confidence score for the search query that is calculated by a needle-intent classifier based on at least the n-grams of the search query and a language model analysis of the n-grams, and wherein the needle-confidence score represents a probability that the search query was intended as a needle search; classifying the search query as a needle search if the calculated needle-confidence score is above a threshold confidence score; and generating a plurality of search-result modules, each search-result module comprising one or more search results matching the search query, wherein one of the search-result modules is a social module, and wherein the number of search results in the social module is based on the classification of the search query as a needle search.

19 Claims, 7 Drawing Sheets

(56) References Cited

U.S. PATENT DOCUMENTS

| | | |
|---|---|---|
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,521,526 B1 * | 8/2013 | Lloyd .................. G10L 15/197 704/236 |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,152,634 B1 * | 10/2015 | Bhattacharjee ....... G06F 16/435 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | Demaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290635 A1 * | 11/2012 | Yuki .................... G06Q 10/10 709/202 |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0006986 A1 * | 1/2013 | Phan .................... G06Q 10/10 707/737 |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 * | 5/2013 | Lee .................... H04L 63/105 707/749 |
| 2013/0124542 A1 * | 5/2013 | Lee .................... G06Q 50/01 707/751 |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |

(56) References Cited

U.S. PATENT DOCUMENTS

| | | |
|---|---|---|
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2013/0275519 A1* | 10/2013 | Nichols ............... G06Q 10/107 709/206 |
| 2013/0311458 A1* | 11/2013 | Goel .................... G06F 16/248 707/723 |
| 2014/0006416 A1 | 1/2014 | Leslie |
| 2014/0025702 A1* | 1/2014 | Curtiss ................. G06Q 50/01 707/769 |
| 2014/0067535 A1 | 3/2014 | Rezaei |
| 2014/0122465 A1 | 5/2014 | Bilinski |
| 2014/0207748 A1* | 7/2014 | Sood ................... G06F 16/9537 707/706 |
| 2014/0214822 A1* | 7/2014 | Sinha ................. G06Q 30/0201 707/731 |
| 2014/0244612 A1* | 8/2014 | Bhasin ................... H04L 67/22 707/706 |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2016/0012454 A1* | 1/2016 | Newton ............. G06F 16/9535 705/7.29 |
| 2016/0026727 A1 | 1/2016 | Bar-Yossef |
| 2017/0351679 A1* | 12/2017 | Shivaswamy ........... H04L 51/32 |

* cited by examiner

CLASSIFYING SEARCH QUERIES ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may classify search queries into one or more categories by implementing one or more intent classifiers, including a needle-intent classifier, and use the classification to return more search results that are relevant to the search query. The needle-intent classifier may calculate confidence scores for one or more search query types. Search query types may include, for example, needle search, person search, public search, and grammar search, among others. In particular embodiments, each query type may be associated with its own intent classifier. As an example and not by way of limitation, the social-networking system may implement a person-intent classifier in addition to or instead of the needle-intent classifier. Search queries may be classified in different categories. For example, a search query to retrieve general information about a topic (e.g., "fly fishing") may be classified as a public search; a search query to retrieve information about a particular person may classified as a person search; a search query to retrieve a particular post that a user has previously viewed may be classified as a needle search, and a search query to retrieve a particular object based on references to particular social graph elements and may require semantic parsing instead of query string matching may be classified as a grammar search (e.g., "friends of my friends who like unicycling"). If the needle-intent classifier classifies a search query as a needle search, the social-networking system may adjust the search results based on the classification. For example, if a user inputs a search query that the needle-intent classifier classifies as a needle search, the social-networking system may return as search results a greater number of references to content objects posted by the user's first and second degree friends, which are posts the querying user has likely viewed previously and thus more likely to be the particular post the user is intending to find. Thus, the needle-intent classifier may be used to dynamically size the social search results provided to a user.

The needle-intent classifier may classify search queries using one or more statistical models, such as neural networks and condition random field (CRF) modeling. The needle-intent classifier may use CRF techniques to label search queries as one or more of at least the following categories: "needle," "grammar," "person," or "public." The needle-intent classifier may classify search queries as other types of search query types not listed here. The search query classification may be determined by calculating a sub-score for the search query, and then normalizing the sub-score to obtain a confidence score. The sub-score may be based on one or more of: (1) the n-grams in the search query; (2) the context of the search query (e.g., time of day, related searches performed by the same user, references to content objects the user has clicked on in the past); or (3) one or more language model analyses. The confidence score may be used by the social-networking system to adjust the search results in one or more search-result modules.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
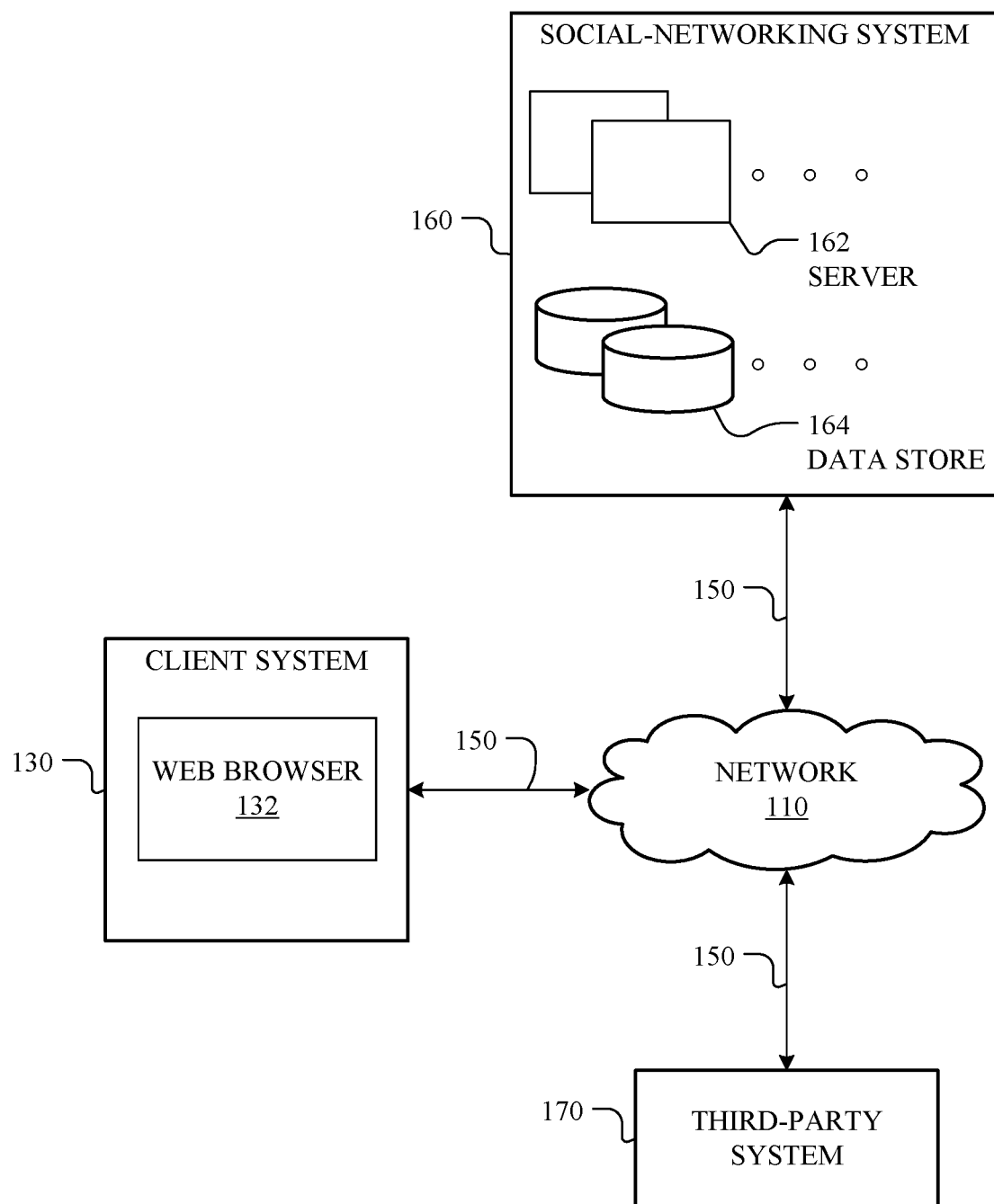
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME, APPLE SAFARI, or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference odule, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
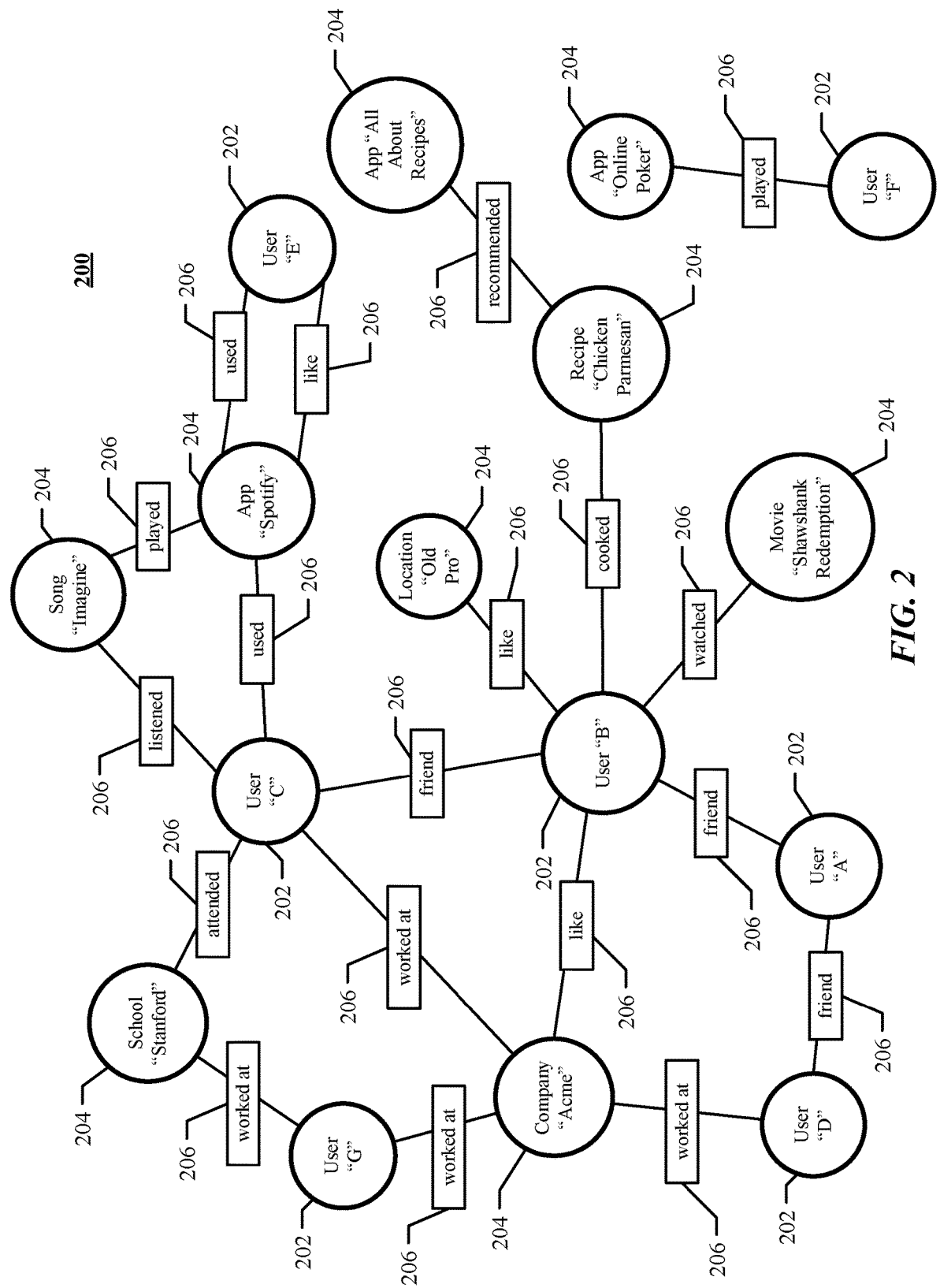
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user (e.g., the user who inputs a search query) based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Classifying Search Queries

In particular embodiments, the social-networking system 160 may classify search queries into one or more categories by implementing a needle-intent classifier. The social-networking system 160 may use the classification to return more search results that are relevant to the search query. Search queries may be classified in different categories. As an example and not by way of limitation, a search query to retrieve general information that is publicly available about a topic (e.g., "fly fishing") may be classified as a public search; a search query to retrieve information about a particular person may classified as a person search; a search query to retrieve a particular post or reference to a particular post (which may have been previously viewed by the user) may be classified as a needle search; and a search query to retrieve a particular object based on references to particular social graph elements by be classified as a grammar search (e.g., "friends of my friends who like unicycling," where "friends of my friends" is a reference to particular user nodes 202 in the social graph 200, and where "who like" is a reference to a particular edge-type connecting those nodes to a concept node 204 for "unicycling"). In particular embodiments, each query type may be associated with its own intent classifier (e.g., a public-intent classifier, a person-intent classifier, a grammar-intent classifier, and other intent classifiers may be implemented by the social-networking system 160). As an example and not by way of limitation, the social-networking system 160 may implement a person-intent classifier in addition to or instead of the needle-intent classifier. In particular embodiments, the social-networking system 160 may adjust the number and type of search results presented to the user based on the classification of the search query. As an example and not by way of limitation, if a user inputs a search query that the needle-intent classifier classifies as a needle search, the social-networking system 160 may return as search results a greater number of references to content objects posted by the user's first and second degree friends, which are posts the querying user has likely viewed previously and thus more likely to be the particular post the user is intending to find. Thus, the needle-intent classifier may be used to dynamically size the social search results provided to a user. Although this disclosure describes classifying queries in a particular manner, this disclosure contemplates classifying queries in any suitable manner.

Figure 3:
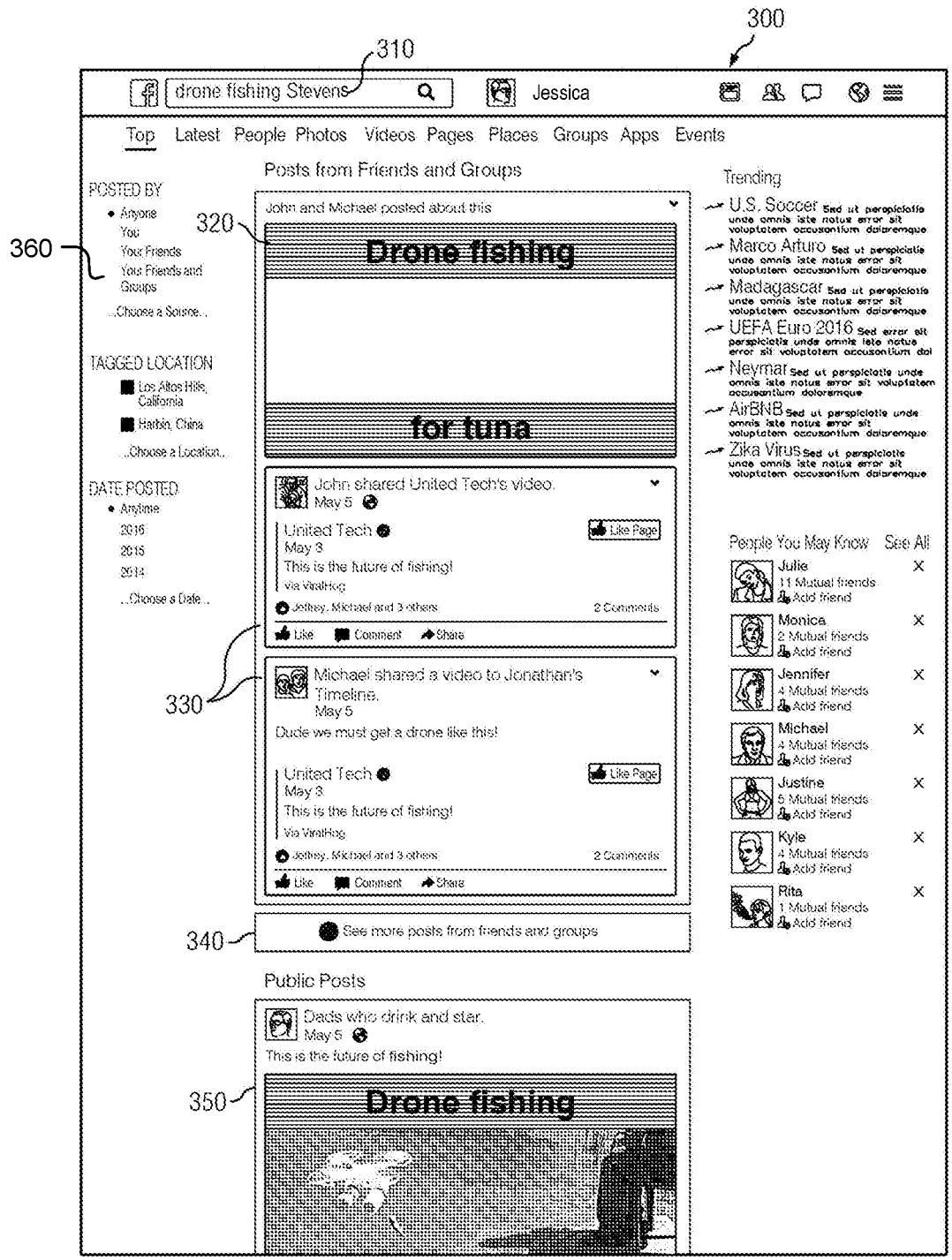
FIG. 3 illustrates an example search-results interface displaying example search results for an example needle search.

FIG. 3 illustrates an example search-results interface 300 displaying example search results for an example needle search. In particular embodiments, the social-networking system 160 may receive, from a client system 130 of a first user of an online social network, a search query inputted by the first user. The search query may comprise one or more n-grams. The first user may be represented by a first node on a social graph 200 and the search query may be related to a post or other content object posted by a second user of the online social network. The second user may also be represented by a second node on the social graph 200. The first node and the second node may be connected by an edge 206 on the social graph 200. As an example and not by way of limitation, the social-networking system 160 may receive a search query from a user, Jessica, related to a post that she viewed previously. The post that Jessica previously viewed may be a video about fishing with aerial drones (referred to as "drone fishing") as well as a brief description comprising one or more n-grams, such as "This is the future of fishing!" The post may have been posted by Jessica's friend, Michael Stevens. As another example and not by way of limitation, the social-networking system 160 may receive a search query from, Jessica, which she may have entered into query field 310, related to a post that she viewed previously, but was posted by a friend of Michael Stevens. This friend may be Jessica's second degree connection. Jessica may have viewed it because one of her first degree connections liked, commented on, viewed, or otherwise interacted with the post. Although this disclosure describes receiving particular search queries in a particular manner, this disclosure contemplates receiving any suitable search queries in any suitable manner.

Continuing with the example illustrated in FIG. 3 and discussed above, after Jessica has viewed the drone fishing video, she may wish to share the video on the online social network, but may need to locate it in her newsfeed first. To locate the drone fishing video posted by Jessica's friend Michael, Jessica may input in query field 310 any number of queries to locate the particular post about drone fishing that Steven posted. She may or may not remember various pieces of this post, such as who posted it, the caption, other people that were tagged in the post, comments, etc. Some examples of search queries Jessica may enter may include: "Drone fishing Stevens," "drone fishing michael," "fishing Michael Stevens," "Fishing quadcopter," and "Future of fishing," among others. These search query examples may be indicative of Jessica's intent to locate a specific post that she had previously viewed, because the search query examples either reference one of Jessica's first of second degree connections, quote or paraphrase some part of a content object that appeared in Jessica's newsfeed, or otherwise relate to a content object that appeared in Jessica's newsfeed and was thus posted by a user within Jessica's social network. Thus, this type of search may be referred to as a needle search. In response to a needle search, the social-networking system 160 may show more "social" results. Social results may be posts that members in a user's social network (e.g., 1st and 2nd degree connections) have posted. It is likely that a post viewed by a user in a newsfeed may have been posted by that user's first or second degree connections, and thus such posts are likely to be the intended target of a needle search. In the above example, Steven's drone fishing post would be considered a social result, because he is Jessica's friend on the online social network (i.e., first degree connection in the social graph 200). Users may perform needle searches because they want to find a specific post that a user in their online social network has posted (which may, for example, have been previously viewed by the querying user in their newsfeed); thus, the social-networking system 160 may return more social results when it detects a needle search (e.g., by auto-expanding a social module in the search-results interface). A search-results interface may display one or more search results, which may correspond to content objects that are relevant to the search query.

The social-networking system 160 may organize the search results into one or more search-result modules. Search-result modules may be a way to group similar search results. Examples of search-result modules may include a social module, a public module, or person module, among others. A social module may display references to content objects (e.g., posts, photos, videos) posted by entities within the querying user's social network (e.g. first and second degree connections within the social graph 200). A public module may display references to publicly viewable content objects (e.g., posts where the visibility/privacy of the post is set to "public"). A person module may display references to profiles associated with users on the online social network. Continuing with the prior example, the social-networking system 160 may detect, by the needle-intent classifier, that the search query, "drone fishing michael," is a needle search, and as a result may expand the social module (i.e., display more social results in the social module). This may be seen in FIG. 3, where the social module 320 shows search results 330 from Jessica's first and second degree connections (e.g., John and Michael). Such posts may appear under a title such as "Posts from Friends and Groups." In particular embodiments, the social-networking system 160 may also provide a see-more element 340 in conjunction with the search results 330 in the social module 320. When the user selects the see-more element 340, the social-networking system 160 may display at least one additional post in the module (e.g., one additional post from the user's first or second degree connections in a social module). Adjacent to the social module 320, a public module may display one or more public search results 350. In particular embodiments, a filter bar 360 may enable a user to filter the search results by selecting one or more filter options. For example, the querying user can select whether to filter results based on one or more authors of the content corresponding to the search results, one or more geographic locations associated with particular search results, one or more dates associated with particular search results, other suitable filters, or any combination thereof. More information on filtering search results may be found in U.S. patent application Ser. No. 13/732,910, filed 31 Dec. 2012, and U.S. patent application Ser. No. 15/228,771, filed 4 Aug. 2016, which are incorporated by reference.

Figure 4:
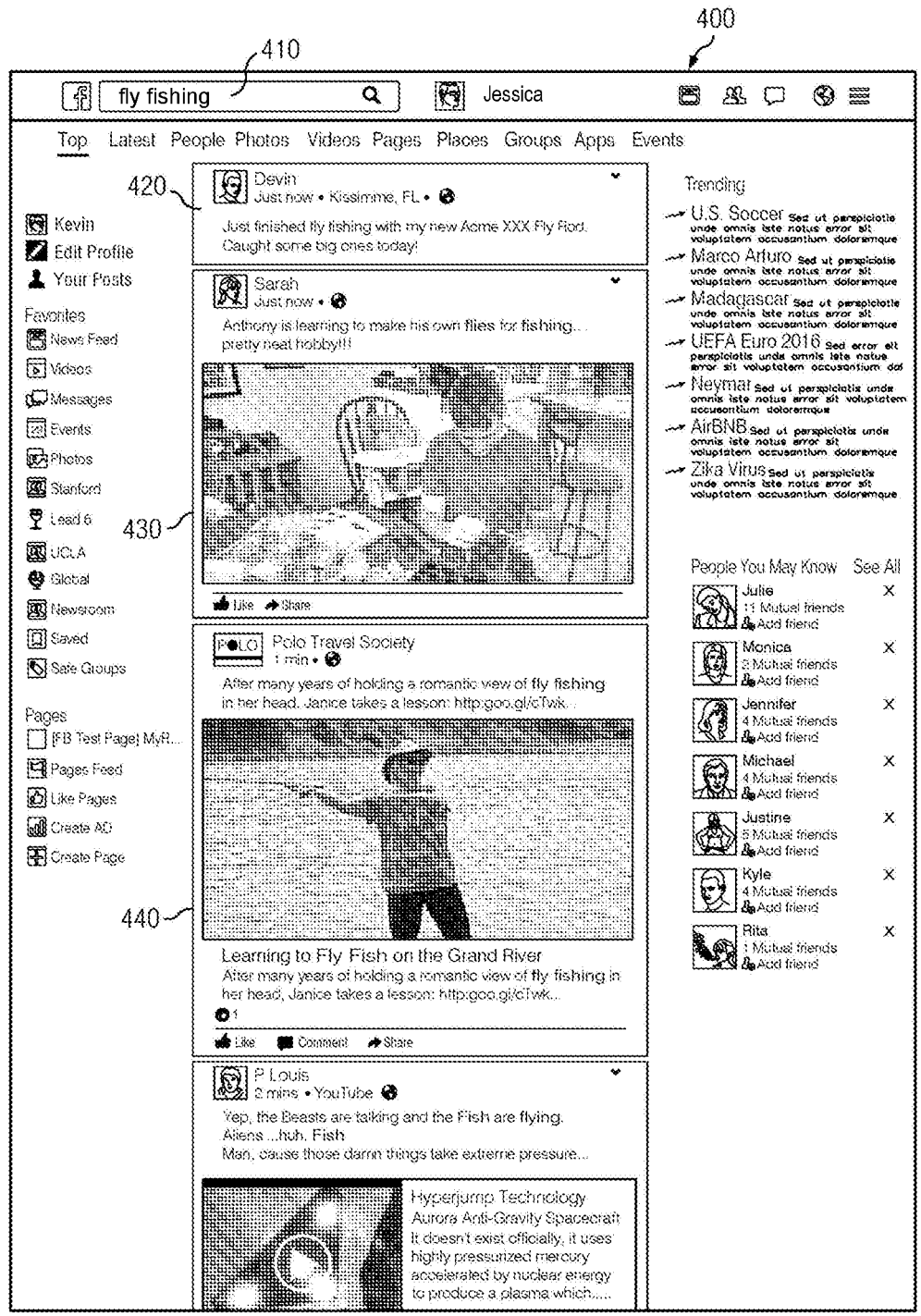
FIG. 4 illustrates an example search-results interface displaying example search results for an example public search.

FIG. 4 illustrates an example search-results interface 400 displaying example search results for an example public search. In contrast to needle searches, a user may input a so-called "public searches," which are searches for publicly available content related to particular topics. A user, Jessica, may be interested in new fishing techniques, but may not be particularly interested in locating a specific post that she had seen previously. In this case, she may enter into the query field 410 search queries like "fly fishing," "fishing tips," "how to catch more fish," and the like. These searches may reveal that Jessica is interested in general knowledge about fishing. The social-networking system 160 may determine that Jessica is interested in general knowledge about fishing because her search queries may be unrelated to posts, comments, and other content objects that have appeared in her news feed. Searches like these may be classified as a public search (also referred to as a "content," "general," or "set" search). In response to a public search, the social-networking system may return fewer social results and more public results (i.e., search results referencing content that has a privacy/visibility setting of "public," and thus viewable by all users of the online social network). Public results 420, 430, and 440 may be displayed in response to the example search query "fly fishing" in the query field 410. Public results may include posts by users that are within the querying user's social network (i.e. are first and second degree connections of the querying user in the social graph 200), but are nevertheless publicly viewable on the online social network. Public results may further include posts that users that are outside the querying user's social network, but that are nevertheless publicly viewable on the online social network.

In particular embodiments, the needle-intent classifier may calculate a needle-confidence score for the search query. To accurately classify search queries, the needle-intent classifier may assign confidences scores for a search query. The confidences scores may be assigned in association with the different types of search queries. Examples of confidence scores may include a needle-confidence score, a public-confidence score, a person-confidence score, and a grammar-confidence score, among others. In particular embodiments, the needle-intent classifier may implement one or more of statistical models, such as neural networks and condition random field (CRF), to more accurately classify search queries. CRF involves predicting a large number of variables that depend on each other as well as on other observed variables. CRF may combine graphical modeling with classification methods to predict outcomes that are based on many input variables. In particular embodiments, the needle-intent classifier may use CRF techniques to label queries as one or more of the following: "needle," "grammar," "person," or "public," among other search query types. The needle-confidence score may be calculated by first calculating a needle sub-score, along with sub-scores for other query types. A given sub-score (e.g., needle sub-score) may be based on one or more of: (1) the n-grams of the search query; (2) a language model analysis of the n-grams; (3) the context of the search query (e.g., the time of day that the querying user inputs the search query, search queries inputted by the querying user in the past, content objects the querying user has interacted with in the past); and (4) a word2vec analysis model. Once a needle sub-score has been determined along with one or more sub-scores of other query types, the needle sub-score may be normalized over the sum of all calculated sub-scores. Normalizing the needle sub-score may produce a needle-confidence score. Likewise, normalizing the sub-score of any query type may produce the needle-confidence score of that query type. For example, the needle-confidence score representing a probability that a given search query was a needle search, given the query, may be expressed in the following equation:

$$P(\text{needle} \mid q) = \frac{\text{needle}}{\text{needle} + \text{grammar} + \text{person} + \text{public}}$$

where needle may be the sub-score that the search query was a needle search, grammar may be the sub-score that the search query was a grammar search/structured query, person may be the sub-score that the search query was a search for a particular person, and public may be the sub-score that the search query was a public search. The needle-confidence score may represent a probability that the search query was intended as a needle search. Likewise, the confidence score of any query type may represent the probability that the search query was intended as a search of that type. As an example and not by way of limitation, a person-confidence score of 0.4 may represent that the probability that the search query was intended as a person search was 0.4. The above formula may be generalized as:

$$P(n_1 \mid q) = \frac{n_1}{\sum_{1 \to x} n_x}$$

where $n_1$ may be a particular sub-score (e.g., needle, grammar, person, public), q may be the search query, and the expression in the denominator may be the sum of the calculated sub-scores. If the needle-intent classifier calculates a needle-confidence score above a particular threshold, the search query may be classified as a needle search, and more social results may be shown to the user. Although this disclosure describes calculating particular scores in a particular manner, this disclosure contemplates calculating any suitable score in any suitable manner.

In particular embodiments, the needle-intent classifier may calculate a needle-confidence score based at least in part on the n-grams in the search query. As an example and not by way of limitation, the social-networking system 160 may calculate a needle-confidence score for a search query entered by a user, Jessica, that states "Future of fishing." Jessica may have Michael Stevens' particular post in mind when entering this search query. The social-networking system 160 may analyze the n-grams in the search query and, in particular embodiments, compare the search query to content objects (e.g., posts, videos, links, metadata, photos) in a social graph 200 associated with Jessica (e.g., content objects associated with entities within two degrees of separation of the user node 202 corresponding to Jessica). As an example and not by way of limitation, the social-networking system 160 may determine that a post by another user in Jessica's social network also says "this is the future of fishing." Because this post matches Jessica's search query, it may be likely that the needle-intent classifier may calculate a high needle sub-score for the search query. As another example and not by way of limitation, the social-networking system 160 may calculate a needle-confidence score for a search query entered by a user, Jessica, that states, "michael drone fishing." As Michael is a name of one of Jessica's first degree connections, the social-networking system 160 may narrow down the pool of possible search results to users whose name is Michael. The social-networking system 160 may then determine that a user named Michael Stevens posted a video that had metadata tags for "drone" and "fishing." Because this post matches Jessica's search query, the needle-intent classifier may calculate a relatively high needle sub-score for the search query. As a contrary example, if Jessica inputs a search query that states "fly fishing," the social-networking system 160 may analyze the n-grams in the search query and determine that "fly fishing" does not appear in any content objects (or perhaps very few content objects) associated with entities in Jessica's social network. Because "fly fishing" does not appear in Jessica's social network, the social-networking system 160 may assign a low needle sub-score to the search query, "fly fishing."

In particular embodiments, the needle-intent classifier may calculate a needle-confidence score based at least in part on a language model analysis of the search query. The social-networking system 160 may use as the language model any suitable language model, including but not limited to: a query likelihood model, a word2vec model, an n-gram model, a continuous space model, a positional language model, other suitable language models, or any combination thereof. A query likelihood model is a technique used in information retrieval, wherein documents are ranked based on the probability of a particular document being relevant, given a particular search query. A word2vec model may be used to produce word embeddings. It may be an n-layer neural network that is trained to reconstruct linguistic context of words. Word2vec may take as its input a large corpus of text and may produce a d-dimensional space (typically of several hundred dimensions), with each unique word in the corpus being assigned a corresponding d-dimensional vector in the space. Word vectors may be positioned in the vector space such that words that share common contexts in the corpus may be located in close proximity to one another in the d-dimensional space (e.g., the vectors have a relatively high cosine similarity). An n-gram model takes a contiguous sequence of n items from a given sequence of text or speech, and predicts the next item in such a sequence in the form of a (n−1)-order Markov model. Continuous space language models may use continuous representations or embeddings of words to make their predictions. Examples of continuous space language models include neural network based language models and log-bilinear models. Although this disclosure describes calculating a needle-confidence score based on particular language models in a particular manner, this disclosure contemplates calculating needle-confidence scores based any suitable language models in any suitable manner.

In particular embodiments, the needle-confidence score may be further based on one or more contextual factors. The contextual factors may include one or more of a time of day that the first user inputted the search query, one or more related searches previously inputted by the first user, one or more content objects the first user has previously interacted with, other suitable contextual factors, or any combination thereof. A user interaction with a content object may include the user posting, accessing, viewing, modifying, sharing, liking, commenting on, or otherwise interacting with the content object within the online social network. As an example and not by way of limitation, a user Jessica may view a post by her friend Samantha which says "Did you know that the average American woman now weighs as much as the average 1960s American man?" The post may have also provided a link to an article that includes data about weight gain in the United States over the last fifty years. Jessica may interact with this post by simply viewing the post (e.g., by scrolling past the post on her newsfeed), by clicking on the link Samantha provided, by liking the post, by commenting on the post, by sharing the post, or by any other suitable manner. The social-networking system 160 may detect how long Jessica interacted with the post by measuring how long that post was viewable on Jessica's client system 130. For example, if the social-networking system 160 determines that Jessica stopped scrolling through her newsfeed at Samantha's post for a particular amount of time, it may determine that Jessica's level of interaction with that post may be higher than with other posts that Jessica scrolled through more quickly. If Jessica stopped scrolling on Samantha's post for a period of time, this may be an indication that Jessica read the post and may want to locate the post in the future. Thus, the needle-confidence score for a search query related to Samantha's post may be higher than if Jessica simply scrolled past Samantha's post without stopping.

In particular embodiments, the social-networking system 160 may classify the search query as a needle search if the calculated needle-confidence score is above a threshold confidence score. To obtain the needle-confidence score, the needle sub-score may be normalized over the sum of all sub-scores, as discussed above. The needle-confidence score may represent the probability that a given search query was a needle search. As an example and not by way of limitation, the social-networking system 160 may classify the query "Steven drone fishing" as a needle search because the needle-confidence score was calculated to be above a threshold score. As another example and not by way of limitation, the social-networking system 160 may classify the search query "fly fishing" as something other than a needle search (e.g., a public search) because the calculated needle-confidence score for "fly fishing" was below the threshold score (while a calculated public-confidence score may be above a separate threshold score). In particular embodiments, the social-networking system 160 may also implement the needle-intent classifier (or one or more other intent classifiers) to calculate a grammar-confidence score, a person-confidence score, and a public-confidence score, and classify the search query as one of: a needle search, a grammar search, a person search, or a public search based on the relative values of the needle-confidence score, the grammar-confidence score, the person-confidence score, and the public-confidence score. As an example and not by way of limitation, the social-networking system 160 may calculate for the search query "Stephen drone fishing," the following confidence-scores: needle-confidence score: 0.6; grammar-confidence score: 0.2; person-confidence score: 0.4; and public-confidence score: 0.1. If the threshold score is 0.5, then the search query may be classified as a needle search. In particular embodiments, the threshold confidence score may be predetermined by an administrator of the online social network. In particular embodiments, the threshold confidence score may be dynamically determined based on the n-grams and one or more contextual factors, discussed below. Although this disclosure describes classifying search queries in a particular manner, this disclosure contemplates classifying search queries in any suitable manner.

In particular embodiments, the social-networking system 160 may identify, in response to the search query, one or more content objects associated with the online social network that match the search query. The content objects may be links, posts, photos, videos, comments, or any other suitable object associated with the online social network. As an example and not by way of limitation, a querying user may enter the search query, "pokemon go." In response to this search query, the social-networking system 160 may identify content objects, (e.g., three articles and a video) that match the search query. These content objects may match the search query because they all have "Pokemon Go" in the title, as tags, or in another suitable location (e.g., heading, body of article). The social networking system 160 may generate one or more search results corresponding to the identified content objects, respectively. The social-networking system 160 may send a search-results interface comprising one or more of the search result modules for display. At least one of the displayed search-result modules may comprise the social module. Continuing with the above example, the social-networking system 160 may send to a client system 130 of the querying user a search-results interface that comprises a social module. The social module may comprise a post from the querying user's friend that states "I just caught Jiggly-Puff outside the hospital on Pokemon Go!" The post may also include a photo of the user outside the hospital. Other content objects posted by the querying user's friends may also be included the social module (e.g., a reference to an article titled "Is Pokemon Go the answer to America's obesity problem?").

In particular embodiments, the social-networking system 160 may generate a plurality of search-result modules. Each search-result module may comprise one or more search results matching the search query. The search-result modules may correspond to the different classifications made in the prior step. Alternatively, the search-result modules may be generated independently of the classifications made in the prior step, but may still be associated with one or more of the classifications. In particular embodiments, at least one of the search-result modules may be a social module. The social module may comprise one or more posts by one or more users within a threshold degree of separation of the querying user in the social graph 200. As an example and not by way of limitation, in response to the search query, "Steven drone fishing," and in response to that query being classified as a needle search, the social-networking system 160 may generate a social module comprising relevant search results from the querying user's first and second degree connections. The order of the search results within a particular search-result module may be based on a number of factors, including the particular search result's leaf score, the recency of the post, a level of social-graph affinity between the querying user and the user who posted or uploaded the content corresponding to the search result, other suitable factors, or any combination thereof. As an example and not by way of limitation, if two of Jessica's friends, Steven and John, posted the aforementioned drone fishing video, but Jessica has a higher affinity coefficient with respect to Steven, Steven's post may appear higher in the search results in the social module. In particular embodiments, the number of search results in a particular search-result module may be based at least in part on the classification of the search query. The number of search results in the social module may be based on the classification of the search query as a needle search. In particular embodiments, if the search query is classified as a needle search, the number of search results in the social module may be greater than a number of search results in each other search-result module in the plurality of search-result modules. As an example and not by way of limitation, if the search query is classified as a needle search, the social-networking system 160 may return three results in the social module, two results in the public module, and one result in the grammar module. Although this disclosure describes generating a plurality of search results in a particular manner, this disclosure contemplates generating a plurality of search results in any suitable manner.

In particular embodiments, the social-networking system 160 may additionally calculate, for each search-result module, a leaf score for the search-result module. The leaf score may indicate a measure of closeness between the search query and the one or more search results in the search-result module. As an example and not by way of limitation, a user may input a search query that states: "best blueberry pie recipe using frozen blueberries." A search engine may return a set of search results that reference content objects related to the search query. A first search result may reference a link whose title states: "make the best blueberry pie with frozen blueberries." This may receive a relatively high leaf score (e.g., 4.8 on a scale of 0-5). A second search result may reference a link whose title state: "blueberry pie recipe with fresh blueberries." This may receive a lower leaf score because it does not match the search query as well as the content object referenced by first search result. The social-networking system 160 may then adjust a number of search results in one or more of the search-result modules based on the leaf score for the respective search-result module. Thus, if a particular search results module has several search results with high leaf scores, more results from that module may be displayed to the querying user. In particular embodiments, the social-networking system 160 may display better search results in addition to more search results. This may be because search results with relatively high leaf scores may be better in quality than search results with lower leaf scores.

In particular embodiments, the social-networking system 160 may further train the needle-intent classifier based on information associated with users of the online social network. The training information may include social-graph information of the querying user, click-through data of the querying user, manually created data (e.g., tags), human annotated online user data (e.g., manual labels from administrators of the online social network), other suitable information associated with user, or any combination thereof. This training may occur online or offline. Social-graph information may be used in conjunction with click-through data to train the needle-intent classifier such that the needle-intent classifier may learn whether a particular user is more or less likely to click on a particular search result if that search result also appears in the user's social-graph data. Further, affinity scores may also be taken into consideration. For example, if a querying user consistently clicks through on search results that he also has a high affinity with, this may train the needle-intent classifier to give higher scores to search results with which the querying user has a high affinity. Other contextual factors may comprise manually created data, human annotated online user data, embedded features, syntactic features, entity linking, and semantic matching. In particular embodiments, selection of see-more element 340 may be used as training data. If a user selects the see-more element 340, it may indicate that the user is interested in the search results located in the particular search-result module containing the selected see-more element, but that the top search results were not relevant to the user. Thus, this information may be used by the social-networking system 160 in returning more relevant search results.

Figure 5:
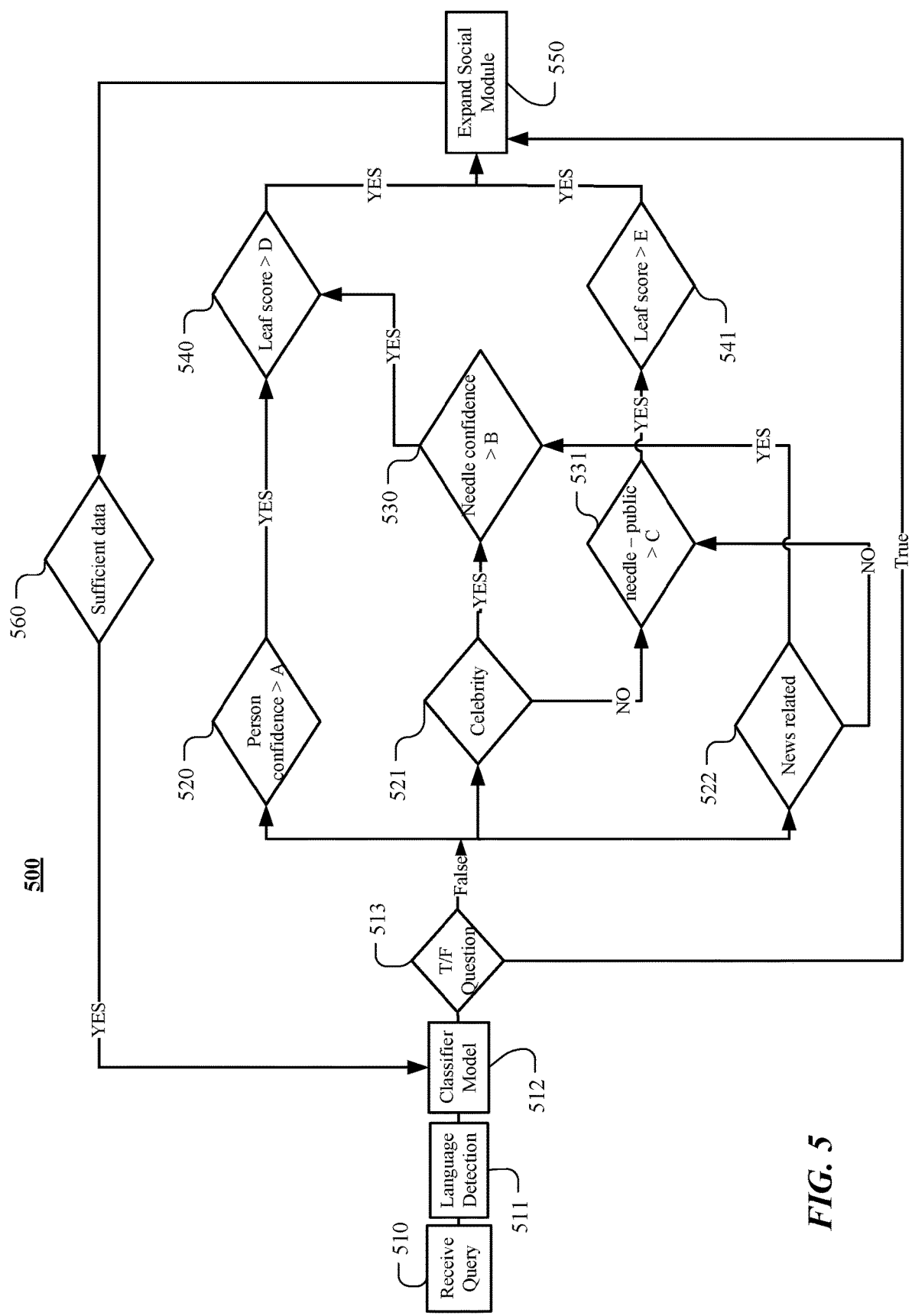
FIG. 5 illustrates an example process of the analysis performed to determine whether to expand a social module in a search-results interface.

FIG. 5 illustrates an example process 500 of the analysis performed by the social-networking 160 to determine whether to expand a social module in a search-results interface. In particular embodiments, the confidence scores (e.g., needle-confidence score, public-confidence score, etc.) of a given search query may be further analyzed to provide more search results that are relevant to the search query. A user may enter a search query, which is received at step 510. As an example and not by way of limitation, a user may enter the query "drone fishing michael." At step 511, language used in the search query may be detected. Continuing with the prior example, the language used in the query "drone fishing michael" may be detected as being English. At step 512, a classifier model, such as a needle-intent classifier described above, may be used to classify the search query. The needle-intent classifier is only one among several classifiers that may be used at step 512. As an example and not by way of limitation, a needle-intent classifier may analyze the query "drone fishing michael" and assign a needle-confidence score, a public-confidence score, a grammar-confidence score, or a person-confidence score to the search query. In particular embodiments, one or more additional confidence scores may be assigned to the search query. As an example and not by way of limitation, the needle-intent classifier may assign the query "drone fishing michael" the following scores: a needle-confidence score of 0.72, a public-confidence score of 0.28, and a person-confidence score of 0.62. These confidence scores are examples only; the public-confidence score and the needle-confidence score need not sum to 1. At step 513, the social-networking system 160 may determine the answer to one or more true/false questions related to the search query. As an example and not by way of limitation, the true/false question may be "does the search query contain the name of the querying user's friend?" If that is true, the process may proceed to step 550 and more social results may be shown. If the answer is false, the process may proceed to step 520, 521, or 522, which are explained below. As another example, the true/false question may be "was the search query suggested on the typeahead feature based on a post that the querying user had previously viewed?" As an example and not by way of limitation, the typeahead feature may automatically populate the query field or an area below the query field with a reference to a post that the querying user has previously viewed, such as the post related to drone fishing. If that is the case, the process may proceed to step 550 and more social results may be shown. If that is not the case, the process may proceed to step 520, 521, or 522, which are explained below.

At step 520, the social-networking system 160 may determine whether the search query relates to a particular user of the online social network by determining whether the previously calculated person-confidence score is greater than a threshold value A. As an example and not by way of limitation, the needle-intent classifier may assign a person-confidence score of 0.62 to the search query "drone fishing michael" because it is likely that "michael" is the name of a user on the online social network. If the person-confidence score is above a threshold score A, the search query's leaf score may be analyzed at step 540. Leaf score may be a measure of how closely a particular search result matches the search query that retrieved the search result. If the leaf score is above a threshold score D, the social-networking system 160 may expand the social module at step 550 (e.g., show more social results). If the leaf score is less threshold score D, the social-networking system 160 may not expand the social module. As an example and not by way of limitation, the social-networking system 160 may have already identified one or more search results for the search query "drone fishing michael." If the leaf score for any of the identified search results is above a threshold score D (e.g., 4.1 on a 0-5 scale), the social-networking system 160 may proceed to step 550 and expand the social module by displaying more search results from the querying user's first and second degree connections.

As step 521, the social-networking system 160 may determine whether the search query relates to a celebrity. This determination may be made by part of the social-networking system 160 that is independent of the needle-intent classifier (e.g., by a celebrity-intent classifier, which may detect references to celebrities in posts and queries of the online social network). If the social-networking system 160 determines that the search query relates to a celebrity, the needle-confidence score as calculated by the needle-intent classifier may be checked at step 530. At this step, the social-networking system 160 may determine if the needle-confidence score is above a threshold score B. The social-networking system 160 may require a higher needle-confidence score if the search query is related to a celebrity because celebrity-related search queries may be more likely to be public searches. Thus, to ensure appropriate expansion of the social module, the social-networking system 160 may require a greater needle-confidence score for celebrity-related searches. As an example and not by way of limitation, the social-networking system 160 may determine that the search query "drone fishing michael" does not relate to a celebrity. In contrast, the social-networking system 160 may determine that the search query "michael jordan best dunks" is related to a celebrity, since it is likely intended to reference the famous basketball player Michael Jordan. In this case the needle-confidence score may need to be greater than threshold score B, which may be, for example, 0.83. If this is true, then the social-networking system 160 may proceed to step 540. At step 540, the social-networking system 160 may check the leaf score of the search results for the search query. If the leaf score is above a threshold score D, the social-networking system 160 may expand the social module at step 550 (e.g., show more social results). If the leaf score is less threshold score D, the social-networking system 160 may not expand the social module.

At step 522, the social-networking system 160 may determine whether the search query is news related. As an example and not by way of limitation, the search query "drone fishing steven" may not be news related. In contrast, the search query "Brussels Bombing" may be news related, since it is likely intended to reference the terrorist attack that occurred in the Brussels Airport in March 2016. This determination may be made by part of the social-networking system 160 that is independent of the needle-intent classifier (e.g., by a news-intent classifier, which may detect references to news-related topics in posts and queries of the online social network). The needle confidence score may be checked at step 530. At this step, the social-networking system 160 may determine if the needle-confidence score is about a threshold score B. The social-networking system 160 may require a higher needle-confidence score if the search query is related to a news event because news-related search queries may be more likely to be public searches. Thus, to ensure appropriate expansion of the social module, the social-networking system 160 may require a greater needle-confidence score for news-related searches. If the needle confidence score is above threshold score B (on a scale from 0 to 1), then the social-networking system may check the leaf score at step 540. If the leaf score is above threshold score D, the social-networking system 160 may expand the social module at step 550 (e.g., show more social results). If the needle confidence is less than threshold score B, or if the leaf score is less than threshold score D, the social-networking system 160 may not expand the social module.

If the search query is not classified as either celebrity or news related, and the name confidence is less than threshold score A, then the difference in confidence scores between needle confidence and public confidence are checked at step 531. If the difference between needle confidence and public confidence is greater than a threshold score C and the leaf score is greater than threshold score E (as determined at step 541), then the social-networking system 160 may expand the social module at step 550 (e.g., show more social results). If the difference between needle confidence and public confidence is less than or equal to threshold score C, but needle confidence is still greater than threshold score B, and leaf score is greater than threshold score E, then the social-networking system 160 may expand the social module at step 550. If any of these conditions are not true, then the social-networking system 160 may not expand the social module.

Every time the social module is expanded, the social-networking system 160 may check at step 560 to determine whether sufficient new click-through data or other collected data has been gathered. If yes, then the search query, click-through data, or any other suitable data may be fed back into the classifier model at step 512 for training purposes. This may be referred to as online training. Thus, the needle-intent classifier may continually acquire new data with which it may use to train itself to better predict a user's intent when the user enters a search query.

Before the needle-intent classifier can analyze and label search queries, it may be necessary for it to undergo offline training (e.g., batch training). Offline training may comprise feeding various data types into the needle-intent classifier to help it learn which search queries should be classified as needle and which should be classified with other labels. Some of the data types fed into the needle-intent classifier may include entities that are part of a particular user's social network, manually created data (e.g., tags), human annotated online user data (e.g., manual labels from administrators), user click-through data, various language models, embedded features (e.g., word2vec analysis), syntactic features (e.g., needle vs. set), entity linking, and semantic matching.

Figure 6:
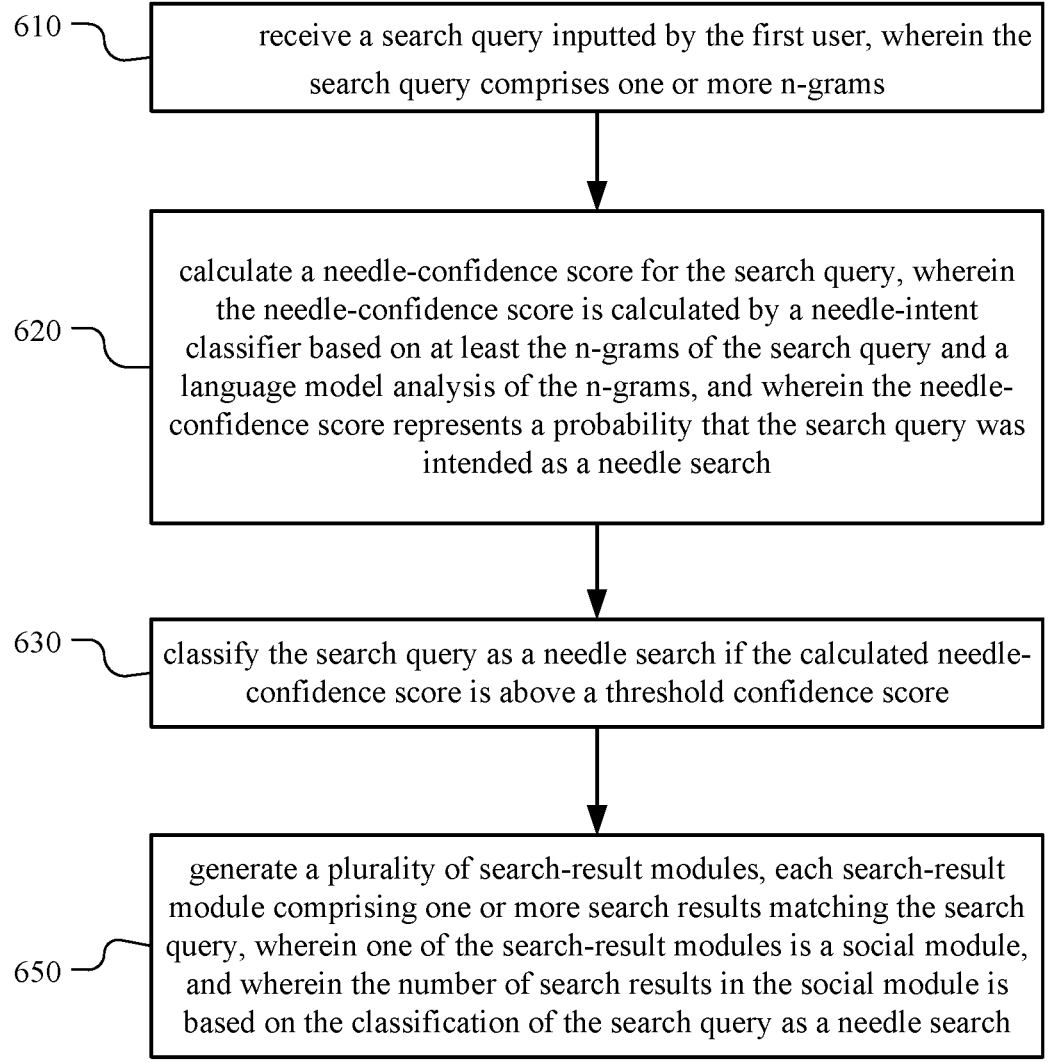
FIG. 6 illustrates an example method 600 for classifying search queries into one or more categories.

FIG. 6 illustrates an example method 600 for classifying search queries into one or more categories. The method may begin at step 610, where the social-networking system 160 may receive a search query inputted by the first user, wherein the search query comprises one or more n-grams. At step 620, the social-networking system 160 may calculate a needle-confidence score for the search query, wherein the needle-confidence score is calculated by a needle-intent classifier based on at least the n-grams of the search query and a language model analysis of the n-grams, and wherein the needle-confidence score represents a probability that the search query was intended as a needle search. At step 630, the social-networking system 160 may classify the search query as a needle search if the calculated needle-confidence score is above a threshold confidence score. At step 640, the social-networking system 160 may generate a plurality of search-result modules, each search-result module comprising one or more search results matching the search query, wherein one of the search-result modules is a social module, and wherein the number of search results in the social module is based on the classification of the search query as a needle search. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for classifying search queries into one or more categories including the particular steps of the method of FIG. 6, this disclosure contemplates any suitable method for classifying search queries into one or more categories including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
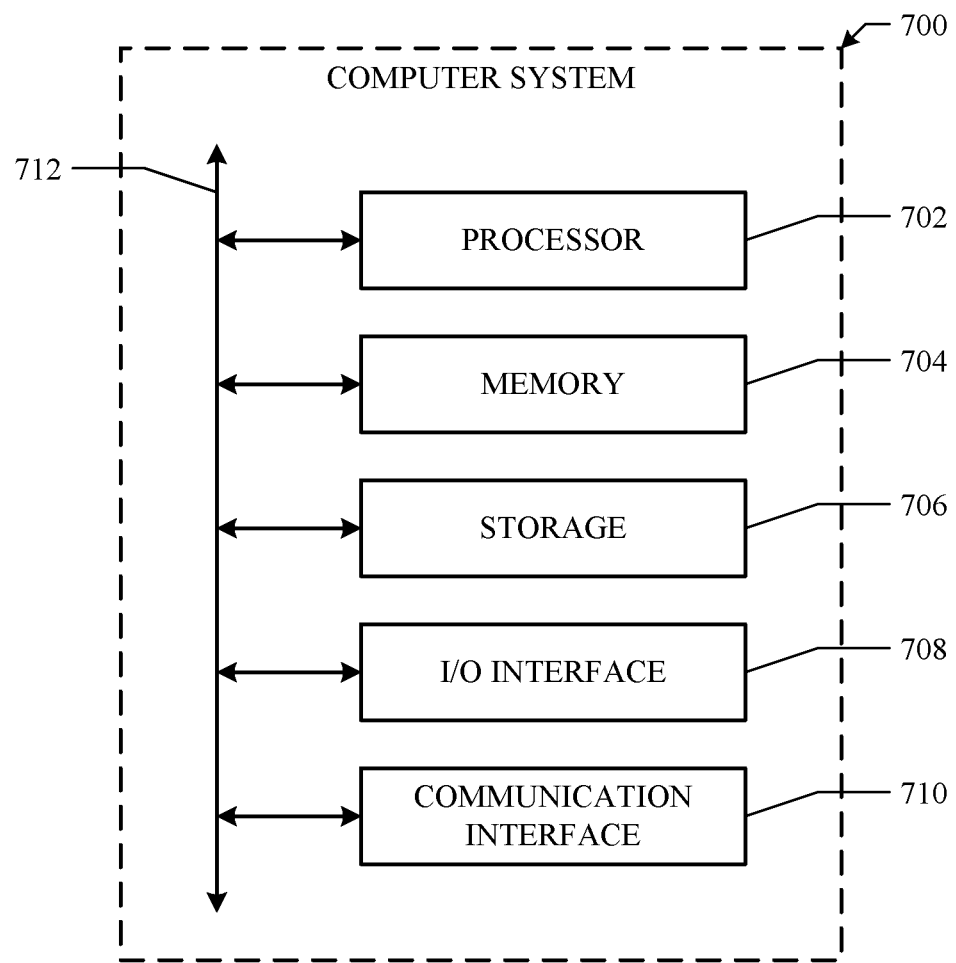
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
receiving, from a client system of a first user of an online social network, a search query inputted by the first user, wherein the search query comprises one or more n-grams;
calculating a needle-confidence score for the search query, wherein the needle-confidence score is calculated by a needle-intent classifier based on at least the n-grams of the search query and a language model analysis of the n-grams, and wherein the needle-confidence score represents a probability that the search query was intended as a needle search for specific content objects associated with the first user's social network connections and previously viewed by the first user;
classifying the search query as a needle search if the calculated needle-confidence score is above a threshold confidence score;
identifying, responsive to the classification of the search query as a needle search, one or more content objects matching the search query, each identified content object being associated with the first user's social network connections and previously viewed by the first user; and
generating a plurality of search-result modules, each search-result module comprising one or more search results referencing one or more content objects matching the search query, respectively, wherein one of the search-result modules is a social module, wherein a number of search results in the social module is based on the classification of the search query as a needle search, and wherein one or more of the search results in the social module reference one or more of the identified content objects associated with the first user's social network connections and previously viewed by the first user.

2. The method of claim 1, further comprising:
calculating, for the search query:
a grammar-confidence score;
a person-confidence score; and
a public-confidence score; and
classifying the search query as one of: a needle search, a grammar search, a person search, or a public search based on the relative values of the needle-confidence score, the grammar-confidence score, the person-confidence score, and the public-confidence score, respectively.

3. The method of claim 1, wherein, if the search query is classified as a needle search, the number of search results in the social module is greater than a number of search results in each other search-result module in the plurality of search-result modules.

4. The method of claim 1, further comprising:
calculating, for each search-result module, a leaf score for the search-result module, wherein the leaf score indicates a measure of closeness between the search query and the one or more search results in the search-result module; and
adjusting a number of search results in one or more of the search-result modules based on the leaf score for the respective search-result module.

5. The method of claim 1, wherein the language model is a query likelihood model wherein the query likelihood model is used to rank one or more of the search results.

6. The method of claim 1, wherein the needle-confidence score is further based on one or more contextual factors, wherein the one or more contextual factors comprise a time of day that the first user inputted the search query, one or more related searches previously inputted by the first user, or one or more content objects the first user has previously interacted with.

7. The method of claim 1, further comprising:
training the needle-intent classifier based on social-graph information of the first user and click-through data of the first user.

8. The method of claim 1, wherein the threshold confidence score has been predetermined by an administrator of the online social network.

9. The method of claim 1, wherein the threshold confidence score is dynamically determined based on the n-grams and one or more contextual factors.

10. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of second users of the online social network, respectively.

11. The method of claim 10, wherein the social module comprises one or more posts by one or more of the second users within a threshold degree of separation of the first user in the social graph.

12. The method of claim 11, wherein each search-result module comprises a selectable see-more element operable to retrieve one or more additional search results for the respective search-result module.

13. The method of claim 12, further comprising:
receiving an indication that the first user has selected the see-more element; and
using the indication as training data for the needle-intent classifier.

14. The method of claim 1, wherein the classification of the search query as a needle search indicates the search query is intended to retrieve a specific content object that the first user has previously interacted with.

15. The method of claim 1, wherein the needle-confidence score is defined as:

$$P(\text{needle} \mid q) = \frac{\text{needle}}{\text{needle} + \text{grammar} + \text{person} + \text{public}},$$

wherein:
P(needle|q) is a normalized probability that the search query is a needle search;
needle is a sub-score representing a likelihood that the search query is a needle search;
grammar is a sub-score representing a likelihood that the search query is a grammar search;
person is a sub-score representing a likelihood that the search query is a person search; and
public is a sub-score representing a likelihood that the search query is a public search.

16. The method of claim 1, further comprising:
identifying, responsive to the search query, one or more content objects associated with the online social network that match the search query and were not previously viewed by the first user; and
generating one or more search result corresponding to one or more of the identified content objects, respectively,
wherein one of the search-result modules is a public module comprising one or more search results referencing one or more of the content objects matching the search query that were not previously viewed by the first user.

17. The method of claim 1, further comprising:
sending, to the client system in response to receiving the search query, a search-results interface comprising one or more of the search-result modules for display, wherein at least one of the displayed search-result modules comprises the social module.

18. One or more computer-readable non-transitory storage media embodying software that is operable when executed to:
receive, from a client system of a first user of an online social network, a search query inputted by the first user, wherein the search query comprises one or more n-grams;
calculate a needle-confidence score for the search query, wherein the needle-confidence score is calculated by a needle-intent classifier based on at least the n-grams of the search query and a language model analysis of the n-grams, and wherein the needle-confidence score represents a probability that the search query was intended as a needle search for specific content objects associated with the first user's social network connections and previously viewed by the first user;
classify the search query as a needle search if the calculated needle-confidence score is above a threshold confidence score;
identify, responsive to the classification of the search query as a needle search, one or more content objects matching the search query, each identified content object being associated with the first user's social network connections and previously viewed by the first user; and
generate a plurality of search-result modules, each search-result module comprising one or more search results referencing one or more content objects matching the search query, respectively, wherein one of the search-result modules is a social module, wherein a number of search results in the social module is based on the classification of the search query as a needle search, and wherein one or more of the search results in the social module reference one or more of the identified content objects associated with the first user's social network connections and previously viewed by the first user.

19. A system comprising: one or more processors; and a non-transitory memory coupled to the processors comprising instructions executable by the processors, the processors operable when executing the instructions to:
receive, from a client system of a first user of an online social network, a search query inputted by the first user, wherein the search query comprises one or more n-grams;
calculate a needle-confidence score for the search query, wherein the needle-confidence score is calculated by a needle-intent classifier based on at least the n-grams of the search query and a language model analysis of the n-grams, and wherein the needle-confidence score represents a probability that the search query was intended as a needle search for specific content objects associated with the first user's social network connections and previously viewed by the first user;
classify the search query as a needle search if the calculated needle-confidence score is above a threshold confidence score;
identify, responsive to the classification of the search query as a needle search, one or more content objects matching the search query, each identified content object being associated with the first user's social network connections and previously viewed by the first user; and
generate a plurality of search-result modules, each search-result module comprising one or more search results referencing one or more content objects matching the search query, respectively, wherein one of the search-result modules is a social module, wherein a number of search results in the social module is based on the classification of the search query as a needle search, and wherein one or more of the search results in the social module reference one or more of the identified content objects associated with the first user's social network connections and previously viewed by the first user.

* * * * *